Patented June 19, 1934

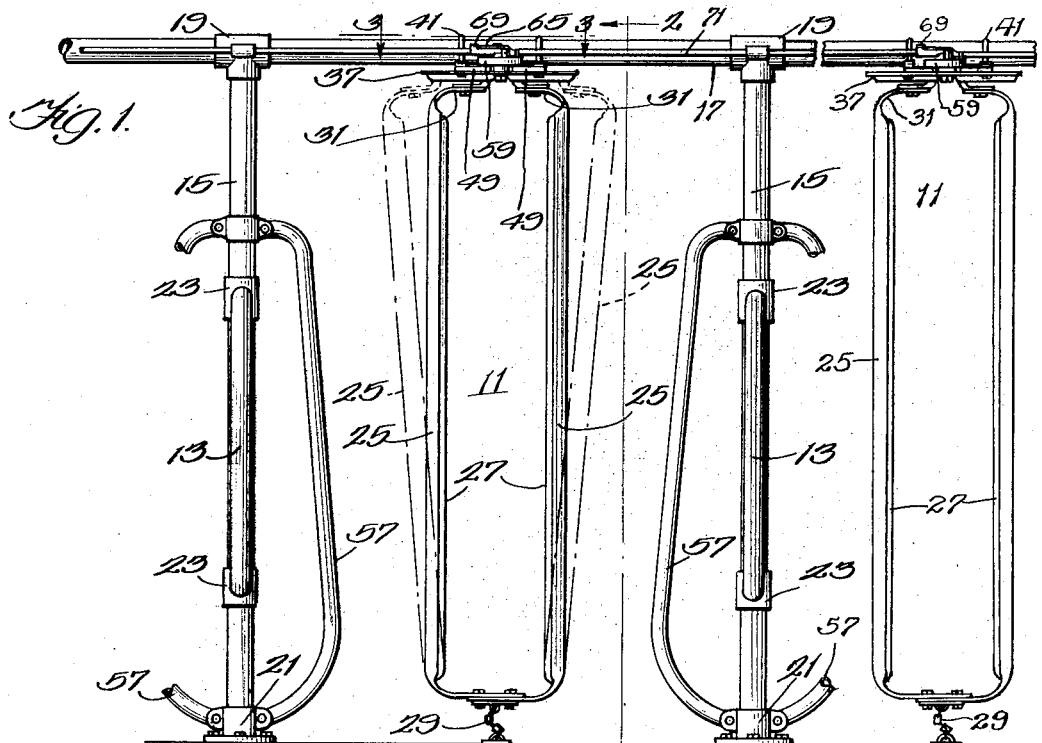
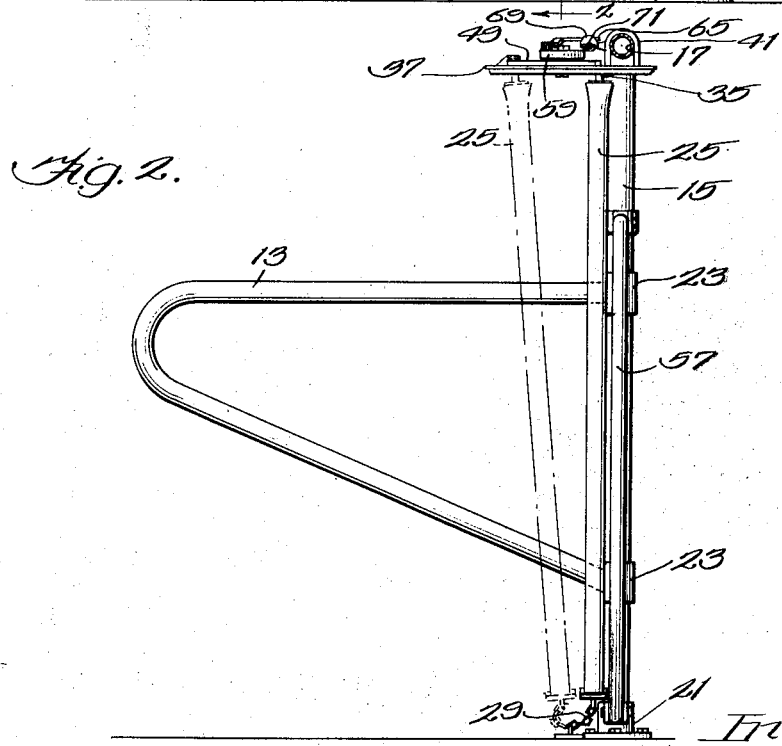

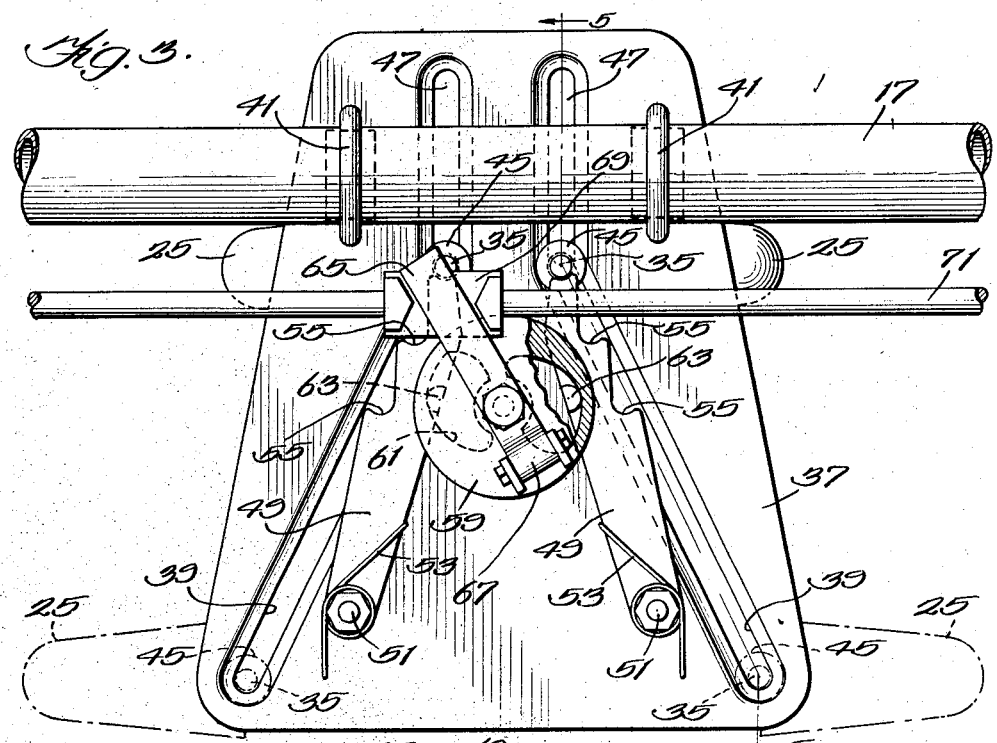
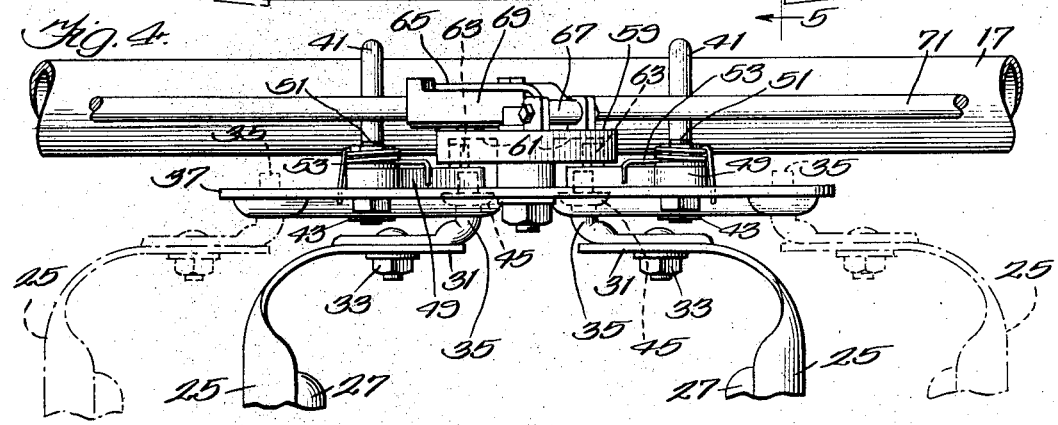
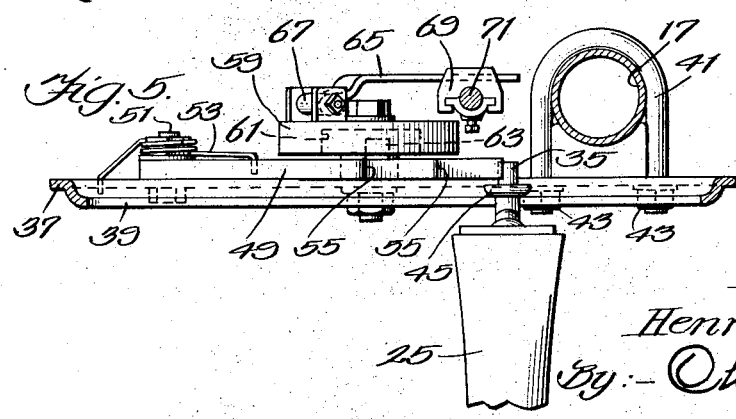

1,963,541

UNITED STATES PATENT OFFICE 1,963,541

SELF-LOCKING COW STANCHION

Henry B. Babson, Chicago, Ill., assignor to Babson Manufacturing Company, Chicago, Ill., a corporation of Illinois Application August 1, 1930, Serial No. 472,371

19 Claims. (Cl. 119—148)

My invention relates in general to animal stalls and has more particular reference to a stanchion for securing a cow or other animal in its stall.

An important object of my invention is to provide a self-locking stanchion which operates automatically to latch itself in closed animal retaining position through the natural movements of the animal in entering the stall to thus eliminate the work of latching the stanchions which, where a large herd of animals is accommodated involves considerable labor.

Another important object of my invention is to provide a self-locking cow stanchion of novel design, cheap and inexpensive construction and capable of securely retaining a cow or other similar animal in its stall.

Another important object of my invention is to provide means for unlocking a plurality of stanchions simultaneously so that all stanchions of a set may be unlatched at one time from a master control.

Referring to the drawings:

Figure 1 is a perspective view of a part of a row of stanchions embodying my present invention;

Figure 2 is a vertical section taken substantially along the line 2—2 in Figure 1;

Figure 3 is an enlarged perspective view of a portion of the apparatus illustrated in Figure 1 viewed from above;

Figure 4 is a front perspective view of the apparatus illustrated in Figure 3; and Figure 5 is a vertical section taken substantially along the line 5—5 in Figure 3.

To illustrate my invention, I have shown on the drawings a portion or section of a row of cow stanchions 11. It will be understood that a series of cow stanchions similar to the one illustrated may be arranged in spaced relationship, preferably along the side of a barn or other structure used for housing the animals to be stanchioned. Each stanchion is separated from the adjacent stanchions by partitions 13, which are built into the stanchion and its enclosing stall during the construction of the apparatus. The stall and built-in stanchion comprises a frame formed, in the illustrated embodiment, of vertical spaced uprights 15, which carry at their upper ends an elongated support member 17. This frame of course may be formed of any suitable structural material, but I have shown the same formed of tubular members, which are connected together by means of the ordinary T-pipe couplings 19, the uprights 15 being secured to the floor by means of pipe flanges 21 of common construction.

The partition members 13 consist of curved tubular members which are fastened to the uprights 15 by means of the collars 23. The stanchions 11 comprise yokes which are hung by suitable mechanism from the support member 17. The yokes each comprise a pair of arms 25 preferably formed of spring steel, the intermediate portions being curved to form channels facing inwardly and containing circular rods 27 preferably of wood, in order to provide a comfortable wearing surface for engaging the neck of the animal when the same is received in the stanchion. The lower ends of the arms 25 are connected in spaced relationship in any suitable way, preferably so that interconnected portions may normally urge the yoke to the open position shown in dotted lines in Figure 1. The yokes are or may be loosely connected as by means of a chain 29 with the floor. The upper end of each arm 25 is curved inwardly to provide a flange 31, which is perforated to receive a connector 33, whereby to detachably connect an upstanding finger 35. The support member 17 carries a guide plate 37, which is provided with slots 39, the guide plate 37 being in the illustrated embodiment secured to the support member 17 by means of the U-bolts 41, which embrace the member 17 with their curved portions and take through perforations formed in the plate 37 at their ends, which are threaded to receive holding nuts 43. The slots 39 extend in the plate 37 from widely spaced points adjacent the forward edge of the plate to closely spaced points in the plate at their rear central portions thereof and thence extend rearwardly in parallelism to points adjacent the rear edge of the plate.

The edges of the slots 39 also are countersunk to provide depressed grooves, the bottoms of which form the slots 39. These grooves are for the purpose of receiving collars which are formed on the fingers 35, the fingers extending upwardly through the slot 37 to permit the collars 45 to set in the countersunk portions of the plate.

It will be apparent that the slots 39 will provide inclined wedging surfaces for bringing the fingers into close proximity as by a camming action, if and when the same are moved rearwardly of the plate 37. This will of course occur if the animal, in entering the stall, pushes its head between the arms 25 of the stanchion and moves forwardly and presses upon the arms 25 with its shoulders. This is a natural movement of a cow in entering a stall, since food is usually placed behind the stanchion so that, in entering the stall, the cow naturally pushes its head into the stanchion and moves forwardly to reach the food and thus will push the arms of the stanchion and cause the fingers 35 to move rearwardly in the converging slots 39. The rearward movement of the fingers in the slots 39 results in the closing of the arms of the stanchion about the neck of the animal.

In order to retain the fingers 35 in the rearmost parallel portions 47 of the slots 39, I provide spring pressed detents 49 pivotally mounted at their forward ends as at 51 in the plate 37 adjacent the forward portions of the slots 39. These detents extend rearwardly, substantially parallel with the slots 39, but are urged outwardly to slightly overlie the slots at their inner ends by means of the springs 53. The forward portions of the detents 49 are provided with a series of notches 55 in which the fingers 35 will successively interlock during the rearward movement in the slots 39 and will thereby be prevented from moving forwardly again to release the neck of the animal. When the fingers 35 pass the inner end of the detent 49, they will have reached the rearmost parallel portions 47 of the slots 39 and will thereafter be retained in said parallel portions by the end of the detents 49, which will close the forward end of said parallel portions as illustrated in Figure 3 of the drawings. The purpose of the elongated parallel portions 47 is to permit the stanchion arms to move slightly back and forth, in order not to bind the animal.

These stanchions are particularly adapted for use with cows and similar animals, which said animals are largely creatures of habit and can be taught to lock themselves into the stanchions. In order to guide the head of the animal into the stanchion and to prevent the animal from inserting its head at the side of the stanchion, that is to say, between the stanchions and the uprights 11, the upright may be extended or provided with means 57 for substantially closing the opening between the stanchion and the upright. In the illustrated embodiment these means may be formed of tubular members suitably curved and mounted at their ends upon the uprights 15. This is not usually necessary, especially where the stanchions are used for cows, since, as stated heretofore, the cow may be taught to insert its head into the stanchion.

In order to release the stanchion so that the animal may withdraw its head therefrom and thus escape from the stall when desired, I provide a suitable cam member 59, which is or may be pivoted to the plate 37 intermediate the detents 49. This cam member overlies portions of both detents and is provided with cam surfaces 61 adapted to engage upwardly extending cam following projections 63 formed on the detents. The cam member 59 is also provided with an operating handle 65 whereby the same may be rotated about its axis and the cam surfaces 61 are arranged to retract the detents 49 from the locking position illustrated in Figure 3 of the drawings to a position permitting the fingers 35 to move outwardly along the slots 39.

As a further refinement, I have arranged the handle 65 either for individual manual operation or for operation from a master control. For this purpose the handle 65 is pivoted as at 67 to the rotatable cam member 59 and quickly can be swung to a plurality of positions. In one position the handle 65 extends forwardly and may be manually operated. In the other position (which is the position illustrated in Figure 3 of the drawings) the handle 65 is folded across the top of the cam member 59 and projects rearwardly therefrom to engage between the upstanding ears of a collar 69, which said collar is fixedly mounted to an axially slidable operating rod 71, which extends parallel with and is supported from the main support member 17.

It will be understood that the operating shaft 71 extends the entire length of the set of stanchions and any preferable or desired means may be provided for manually shifting the operating shaft 71 axially to thereby turn the several control plates 59.

It is thought that the invention and numerous of its attendant advantages will be understood from the foregoing description and it is obvious that numerous changes may be made in the form, construction and arrangement of the several parts without departing from the spirit and scope of my invention or sacrificing any of its attendant advantages, the form hereinbefore described being a preferred embodiment for the purpose of illustrating my invention.

I claim:

1. In an animal stanchion, a frame, a yoke mounted in the frame and comprising arms arranged for opening and closing movement in the frame and means comprising a member against which the arms are pushed by the animal in entering the stanchion for closing same upon the relative movement of said yoke with respect to said frame.

2. In a stanchion, a frame, a yoke mounted in the frame and comprising arms arranged for opening and closing movement in the frame, means comprising a member engaging said arms for closing same upon the relative movement of said yoke with respect to said frame, latch means to hold said arms in closed position and a rotatable member having cam portions co-operating with said latch means for the purpose of retracting same to release said arms for opening movement in said frame.

3. A stanchion having a yoke member movable into closed position for retaining the animal and to open position for releasing it, and a member having a slot confining within it a portion of the yoke member for positively moving the same laterally either to closed or open position in response to movement of the yoke member in the slot and means to latch the yoke member against longitudinal movement in the slot in at least one direction.

4. A stanchion having a yoke providing a relatively shiftable part adapted to relatively open and close the yoke, and means associated with said relatively shiftable yoke part to move the same to yoke closing position, said yoke closing means comprising a horizontal plate mounted in the stanchion and having an inclined portion and means to secure the shiftable yoke member at various points along said inclined portion.

5. A stanchion having a yoke providing a relatively shiftable member adapted to relatively open and close and actuating means associated with the shiftable yoke member to move the same, said yoke-actuating means comprising a plate mounted in the stanchion and having an inclined portion, means mounted on the plate near the inclined portion to secure the shiftable yoke member on said inclined portion at any one of several spaced positions occupied by the member in traveling along the inclined portion between yoke open and yoke closed position.

6. A stanchion having a yoke providing a relatively shiftable part adapted to relatively open and close, and actuating means associated with the shiftable yoke part to move the same, said yoke-actuating means comprising a plate mounted in the stanchion and having an inclined portion, and latching means carried by the plate for securing the yoke in at least one of its shifted positions on the inclined portion, said latching means being resiliently urged toward latching position, and means to retract said latching means against said urge to permit the yoke part to open.

7. A stanchion having a series of animal yokes, means operable to close the yokes in response to rearward movement imparted thereto by animals in entering the stanchion whereby the animal in entering the yoke may push it rearwardly and serve to close the yoke upon itself, latch means to secure each yoke in rearwardly shifted yoke-closed position, and a shiftable member for retracting each latch means separately to permit the corresponding yoke to open and gang-operating means comprising an operating member extending adjacent each of the yokes and operable from a remote control point, said gang-operating means being cooperatively associated with each shiftable latch-retracting member to actuate the same and selective means for detachably connecting each of the shiftable members to the gang-operating means, said selective means, when disconnected from the shiftable member, providing means for manually operating the shiftable member to trip the latch member of the yoke with which it is associated.

8. A stanchion having a series of animal yokes, yoke-closing means operable to close the yokes in response to rearward movement imparted thereto by animals in entering the stanchion whereby the animal in entering one of the yokes may push it rearwardly and serve to close the yoke upon itself, latch means carried by said closing means to secure each yoke in rearwardly shifted yoke closed position, latch releasing means carried by said yoke-closing means and operating means co-operatively associated with each latch-releasing means and operable from a common remote control point for actuating the latch releasing means, and means to removably connect each latch-releasing means to said operating means.

9. A stanchion having a yoke including relatively movable parts for retaining an animal, and wedge means, rendered operable by rearward movement imparted to the yoke by an entering animal, for moving the yoke parts to animal retaining position whereby the animal, in entering and engaging the yoke, serves to lock itself in.

10. A stanchion having a yoke member movable into closed position for retaining the animal and to open position for releasing it, and a slotted member confining within the slot a portion of the yoke member, said slotted member being arranged to provide a camming action on the yoke member for positively moving the yoke member laterally either to closed or open position in response to longitudinal movement of the member in the slot and latching means carried by the slotted member and adapted to be engaged by the yoke member in traveling along the slot for the purpose of latching the member against movement in the slot.

11. A stanchion having a yoke member movable into closed position for retaining the animal and to open position to release it, and a slotted member confining within the slot a portion of the yoke member, said slotted member forming a cam for positively moving the member laterally either to closed or opened position in response to longitudinal movement of the member in the slot, and latching means comprising a shiftable member having a detent and carried by the slotted member and yieldingly urged to present the detent in the path of the yoke member as it travels along the slot in order to obstruct the movement of the yoke member beyond a predetermined point in the slot in at least one direction.

12. A stanchion having a yoke member movable into closed position for retaining the animal and to open position to release it, and a slotted member confining within the slot a portion of the yoke member, said slotted member providing cam means for positively moving the member laterally either to closed or opened position in response to longitudinal movement of the member in the slot, and latching means comprising a shiftable member having a plurality of detents and carried by the slotted member and yieldingly urged to present the detents progressively in the path of the yoke member as it travels along the slot, the latching means being arranged to permit the yoke member to travel past its detents in one direction and each detent being adapted to engage behind the yoke member in order to obstruct the return movement thereof in the slot after having passed the detent.

13. A stanchion having a yoke member movable into closed position for retaining the animal and to open position for releasing it, and a slotted member confining within the slot a portion of the yoke member, said slotted member being formed to provide cam means for positively moving the member laterally either to closed or open position in response to longitudinal movement of the member in the slot and latching means carried by the slotted member and adapted to be engaged by the yoke member in traveling along the slot for the purpose of latching the member against movement in the slot, said latching means being normally urged toward yoke latching position and being yieldable to permit retraction thereof to permit the yoke member to travel along the slot in the direction permitting yoke opening movement.

14. A stanchion having a yoke providing a relatively shiftable member adapted to relatively open and close, and actuating means associated with the shiftable yoke member to move the same, said yoke-actuating means comprising a plate mounted in the stanchion and having an inclined portion along which the shiftable yoke member may be moved between yoke open and closed position when pushed rearwardly by an animal in entering the same, and latching means cooperating with the shiftable yoke member for securing it in at least one of its shifted positions on the inclined portion.

15. A stanchion having a yoke including a relatively shiftable part adapted to open and close, means comprising a cam operatively associated with said shiftable part and adapted to shift said part to closed position in response to rearward movement in the stanchion imparted to the part by an animal in entering the yoke.

16. A stanchion having a yoke member movable into closed position for retaining the animal and to open position for releasing it, and a slotted member confining within the slot a portion of the yoke member, said slotted member being arranged to provide a camming action on the yoke member for positively moving the yoke member laterally either to closed or open position in response to longitudinal movement of the member in the slot, and latching means carried by the slotted member and adapted to be engaged by the yoke member in traveling along the slot for the purpose of latching the member against movement in the slot, and manually operable means for releasing the latching means.

17. A stanchion having a plurality of yoke members movable into closed position for retaining each an animal and to open position for releasing the animals, a slotted member for each yoke confining within its slot a portion of the associated yoke member, said slotted member being arranged to provide a camming action on the yoke to positively move the same laterally to either closed or opened position in response to longitudinal movement of the yoke in the slot, a latch carried by each of the slotted members and adapted for engagement by the yoke in traveling the slot for the purpose of latching the yoke portion against movement in the slot and latch-releasing means adapted to be operatively connected with any of the individual yoke latches for the purpose of releasing said latches.

18. A stanchion having a plurality of yoke members movable into closed position for retaining each an animal and to open position for releasing the animals, a slotted member for each yoke confining within its slot a portion of the associated yoke member, said slotted member being arranged to provide a camming action on the yoke to positively move the same laterally to either closed or opened position in response to longitudinal movement of the yoke in the slot, a latch carried by each of the slotted members and adapted for engagement by the yoke in traveling the slot for the purpose of latching the yoke portion against movement in the slot, latch-releasing means adapted to be operatively connected with any of the individual yoke latches for the purpose of releasing said latches, and means selectively operable to detachably connect any of the latches with the latch-releasing means whereby any desired number of the latches may be tripped simultaneously.

19. A stanchion having a yoke including relatively movable parts for retaining an animal, and wedge means, rendered operable by rearward movement imparted to the yoke by an entering animal, for moving the yoke parts to animal-retaining position, means to latch the movable yoke parts in closed position whereby the animal, in entering and engaging the yoke, serves to lock itself in, and manually operable means to release said latch.

HENRY B. BABSON.